United States Patent
Ackerman et al.

(10) Patent No.: US 8,246,770 B2
(45) Date of Patent: *Aug. 21, 2012

(54) COPPER GRID REPAIR TECHNIQUE FOR LIGHTNING STRIKE PROTECTION

(75) Inventors: Patrice Ackerman, Kent, WA (US); Steven Blanchard, Issaquah, WA (US); Daniel Kovach, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/877,169

(22) Filed: Sep. 8, 2010

(65) Prior Publication Data

US 2011/0186206 A1    Aug. 4, 2011

Related U.S. Application Data

(63) Continuation of application No. 12/696,403, filed on Jan. 29, 2010, which is a continuation-in-part of application No. 11/220,046, filed on Sep. 6, 2005, now Pat. No. 7,686,905.

(51) Int. Cl.
| | |
|---|---|
| *B29C 73/00* | (2006.01) |
| *B29C 65/00* | (2006.01) |
| *B32B 43/00* | (2006.01) |
| *B32B 37/00* | (2006.01) |
| *B64D 45/02* | (2006.01) |
| *B64D 7/00* | (2006.01) |
| *B64C 1/10* | (2006.01) |
| *H02H 1/00* | (2006.01) |
| *H02H 1/04* | (2006.01) |
| *H02H 3/22* | (2006.01) |
| *H02H 9/06* | (2006.01) |
| *H05F 3/00* | (2006.01) |

(52) U.S. Cl. ......... 156/98; 156/94; 156/298; 156/304.1; 244/1 A; 244/121; 361/117; 361/218; 428/63

(58) Field of Classification Search .............. 156/60, 156/91, 92, 94, 98, 153, 247, 250, 256, 267, 156/276, 278, 279, 280, 306.6, 306.9, 307.1, 156/307.3, 307.7, 330; 428/63, 113, 114, 428/131, 133, 137, 174, 297.4, 299.1; 244/1 A, 244/121, 126; 361/117, 217, 218
See application file for complete search history.

(56) References Cited

U.S. PATENT DOCUMENTS

| | | | | |
|---|---|---|---|---|
| 4,502,092 A | * | 2/1985 | Bannink et al. | ............... 361/218 |
| 4,727,451 A | * | 2/1988 | Covey | ............ 361/218 |
| 4,760,493 A | * | 7/1988 | Pearson | ....... 361/218 |
| 4,789,918 A | | 12/1988 | Bannink | |

(Continued)

*Primary Examiner* — Philip Tucker
*Assistant Examiner* — Brian R Slawski
(74) *Attorney, Agent, or Firm* — Ostrager Chong Flaherty & Broitman P.C.

(57) ABSTRACT

A method for reworking an electrically conductive layer of a composite skin is disclosed in which a patch replaces the altered section of the electrically conductive layer. The method is performed by removing a portion of the electrically conductive layer to reveal the underlying composite skin. A patch is formed, having an electrically conductive section coupled to an adhesive having a low dielectric breakdown strength, and is then introduced over the underlying composite skin such that the adhesive layer covers the underlying composite skin and overlaps an unremoved portion of the electrically conductive layer. The patch is applied such that the electrically conductive section within the patch covers the adhesive layer and overlaps the unremoved section of the electrically conductive layer. The adhesive layer preferably has a low dielectric breakdown strength, so that electricity from lightning which strikes the composite skin may be conducted through the adhesive.

21 Claims, 4 Drawing Sheets

U.S. PATENT DOCUMENTS

| | | |
|---|---|---|
| 4,891,732 A | 1/1990 | Jones |
| 4,912,594 A | 3/1990 | Bannink |
| 5,236,646 A | 8/1993 | Cochran et al. |
| 5,470,413 A * | 11/1995 | Cedarleaf .................. 156/90 |
| 5,499,782 A | 3/1996 | Domine |
| 5,845,872 A | 12/1998 | Pridham et al. |
| 5,865,397 A | 2/1999 | Herrmann |
| 5,882,756 A | 3/1999 | Alston |
| 5,958,166 A * | 9/1999 | Walters et al. .................. 156/94 |
| 6,083,615 A * | 7/2000 | Long et al. ..................... 428/323 |
| 6,156,248 A | 12/2000 | Walling |
| 2001/0053820 A1 | 12/2001 | Yeager |
| 2002/0081921 A1* | 6/2002 | Vargo et al. ..................... 442/16 |
| 2002/0180077 A1 | 12/2002 | Glatkowski |

* cited by examiner

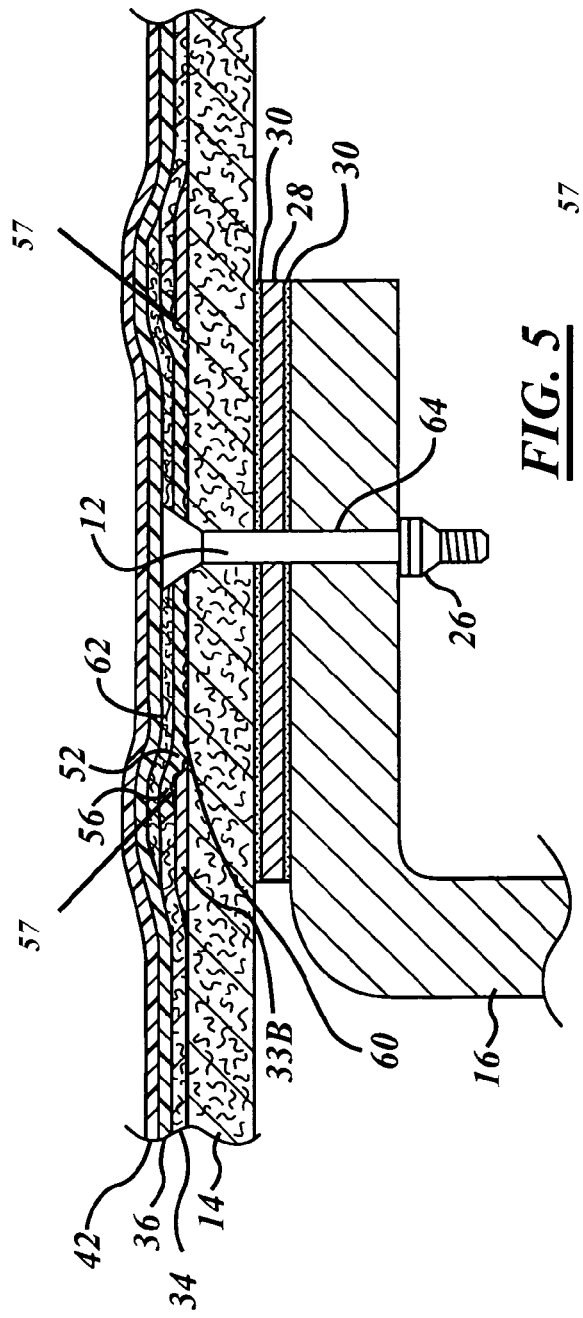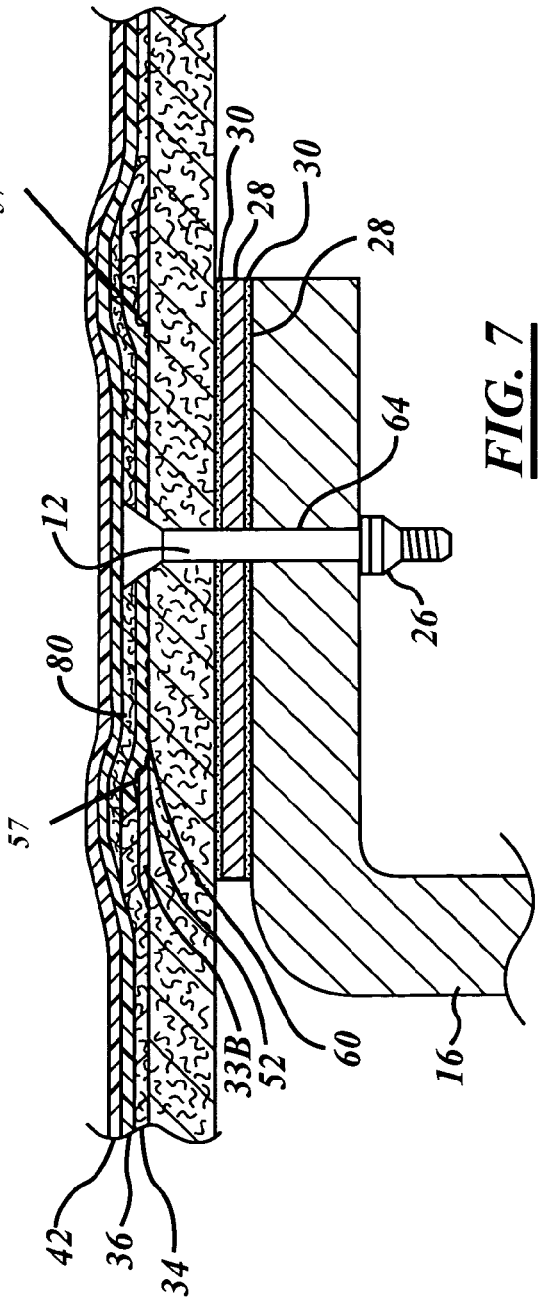

COPPER GRID REPAIR TECHNIQUE FOR LIGHTNING STRIKE PROTECTION

RELATED APPLICATIONS

This application is a continuation of application Ser. No. 12/696,403 filed Jan. 29, 2010, which is a continuation-in-part of application Ser. No. 11/220,046 now U.S. Pat. No. 7,686,905, filed Sep. 6, 2005, the disclosures of which are incorporated herein by reference.

TECHNICAL FIELD

This application generally relates to aircraft lightning strike protection techniques and, more specifically, to a copper grid repair technique for composite aircraft skin panels.

BACKGROUND ART

The use of carbon fiber reinforced plastic ("CFRP") materials, otherwise known as carbon fiber composites, for structural members is increasing in commercial airplanes because of the higher strength-to-weight and stiffness-to-weight ratios afforded by carbon fiber composites as compared to traditional aluminum structures.

A lightning strike to an aircraft causes a high electric current, which may typically be of the order of 100,000 amps, to flow through the aircraft frame. In a carbon fiber composite structure, which is approximately 2000 times more resistive than aluminum, the carbon fiber plies act as very high resistance conductors and the resin between the plies acts as highly capacitive dielectric layers so that lightning striking the carbon fiber composite results in an increasing potential difference produced across the ply structure but no readily available electrically conductive path for discharging the current. The current therefore tends to concentrate at the fasteners between the skin panels and the aircraft substructure, since the fasteners are generally made of highly conductive alloys for strength. When the lightning energy is unable to dissipate at a fast enough rate, arcing, sparks and other unwanted effects may occur.

One known approach to reduce the effect of lightning strikes on non-metallic structures is to apply, by flame spraying or plating, a conductive layer such as aluminum to the outer surface of the skin panels. However, flame spraying or plating are secondary operations used to apply the conductive layer to the already assembled structure. In addition, it is difficult to achieve a satisfactory electrical bond using either of these processes. The protective conductive layer also adds mass without contributing to the strength of the assembled structure, is vulnerable to environmental damage, and is difficult to maintain. The production and maintenance of such an arrangement is thus clearly expensive.

Another known approach to reduce the effect of lightning strikes on non-metallic surfaces is to install a conductive woven screen or foil to the outer surface of the skin panels. However, the use of woven screens or foils requires the use of an additional ply of fiberglass when the non-metallic structure is carbon to electrically isolate the carbon layer from the metal to prevent corrosion and that also adds non-structural weight.

Yet another approach is to employ various special designs of fastener, for example as disclosed in U.S. Pat. No. 4,891,732. The fasteners disclosed in these patents employ a beveled head for countersinking into the surface of the skin panel into intimate contact therewith, and a nut for securing the fastener in place, which nut is designed to transmit electric current safely to the substructure such that arcing will not occur. Again, this approach to the problem of arcing is expensive because of the need for special fastener designs.

Still another known method for protecting fuel systems from lightning strikes is described in U.S. Pat. No. 5,845,872 to Pridham et al., which is herein incorporated by reference, Pridham discloses a method for fastening an outer composite aircraft skin to an inner substructure including the steps of incorporating an electrically conductive layer in or applying it to an outer surface of the outer composite skin, inserting a bolt through the electrically conductive layer and outer composite skin and through the inner substructure, securing the bolt by means of a nut directly or indirectly engaging the inner surface of the inner substructure, and applying insulating material over the head of the bolt. While the Pridham disclosure effectively protects the fuel system from lightning strikes, the proposed system does not address the need for repairing the electrically conductive layer after a lightning strike or after other alteration. The electrical continuity of the electrically conductive layer must be reestablished to provide proper lightning strike protection.

There thus exists a need for an inexpensive and robust technique for repairing outer composite aircraft skins that utilize copper foil along fastener rows for lightning strike protection that have been altered by lightning strikes or in some other in order to maintain the desired lightning prevention system to help divert lightning currents away from substructures.

SUMMARY

The present disclosure provides a method for reestablishing the electrical continuity of an electrically conductive layer, preferably a copper foil grid that includes strips of copper foil coupled to and centered around fasteners located in a fastener line on the composite aircraft wing, that has been previously altered by a lightning strike or in some other manner. The present embodiment utilizes a copper patch and a specialized adhesive layer, and more particularly an unsupported film adhesive having a low dielectric breakdown strength, to replace the altered section of the electrically conductive layer.

An adhesive layer having a sufficiently low dielectric breakdown strength will ensure that when a lightning strike occurs, electricity will be able to pass through the adhesive layer. This would allow electricity to be conducted between the copper foil grid and the composite structural material, thereby reducing current density through fasteners and vastly reducing the chances of arcing or sparks. Preferably, an unsupported (i.e. using no carrier materials such as a scrim) film adhesive is used. Support elements such as a scrim would increase the dielectric breakdown strength of the adhesive layer. This may reduce the effectiveness of the protection against lightning strikes, as there would be a higher current density through fasteners. Further, a scrim is normally used to ensure even thickness at the bond line of the adhesive when it is installed. Removal of a scrim provides higher variation in thickness of the bond line, which in turn results in more places that have low thickness. This in turn results in more places through which lightning current may easily flow, which should help produce lower current density through the fasteners. Therefore, the lack of such conventionally used materials as a scrim produces beneficial results in terms of protection against lightning strikes.

A method for reworking an electrically conductive layer contained on an aircraft skin is provided. This method is preferably used to rework a composite skin layer that has been altered by a lightning strike or by other means, but may be used for other purposes. Under the method described, a section of the electrically conductive layer is removed. This reveals an underlying composite skin. A patch with an electrically conductive section and a special adhesive layer is prepared for placement over the removed section of the composite skin. The patch is introduced over the composite skin such that the adhesive layer covers the composite skin and overlaps an unremoved portion of the electrically conductive layer. To provide good lightning strike protection, the adhesive layer preferably has a low enough dielectric breakdown strength, such that electricity from lightning which strikes the aircraft composite skin may be conducted through the adhesive, thereby reducing current density through fasteners.

Other features, benefits and advantages of the present disclosure will become apparent from the following disclosure, when viewed in accordance with the attached drawings and appended claims.

BRIEF DESCRIPTION OF THE DRAWINGS

FIG. 5 is a section view of a repaired wing structure of FIG. 1 repaired in accordance with the logic flow diagram of FIG. 4;

FIG. 7 is a section view of a repaired wing structure of FIG. 1 repaired in accordance with the logic flow diagram of FIG. 6.

DETAILED DESCRIPTION

The methods for reworking an altered aircraft composite structure having an electrically conductive layer will now be described in the context of a composite aircraft wing 10, whose structure will be described below, with respect to FIGS. 1 and 2. However, nothing in this disclosure should be construed to limit this method to an aircraft wing 10. It should be understood that the method can be applied to other structures, as one of ordinary skill in the art would recognize.

Figure 1:
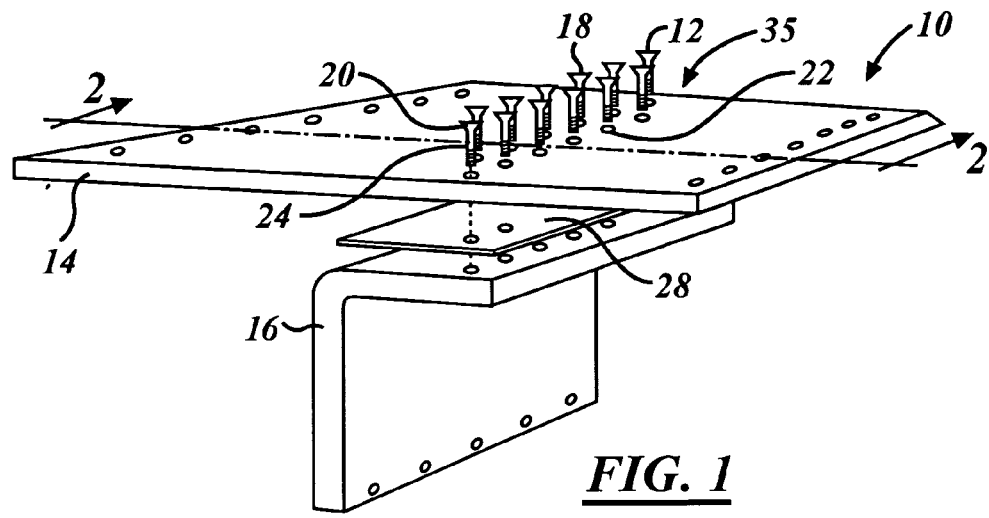
FIG. 1 is a perspective view of a pristine composite wing structure of a commercial airplane.
Figure 2:
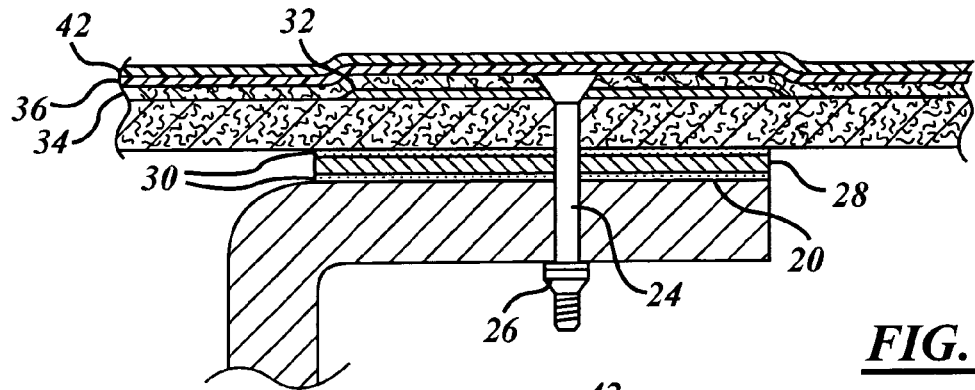
FIG. 2 is a section view of a portion of FIG. 1 taken along line 2-2.

Referring now to FIGS. 1 and 2, a section and perspective view of a portion of a wing structure 10 of an aircraft showing a plurality of fasteners 12 is shown securing a skin panel 14 of an aircraft structure to an inner substructure or spar 16, comprising the wall of a fuel tank (not shown).

The skin panel 14 and the spar 16 are made of carbon fiber composite material of low weight and high strength and stiffness formed by conventional methods well known in the art. For example, in one preferred form, the skin panel 14 is formed from 34 plies of an aircraft quality, machine lay-up structural carbon fiber/epoxy tape laid in a 50/40/10 orientation and having an overall thickness of approximately 0.25 inches, while the spar 16 consists of 44 plies of a hand lay-up version of aircraft quality, structural carbon fiber/epoxy tape laid in a 25/50/25 layup and having an overall thickness of about 0.32 inches. Both the skin panel 14 and spar 16 are primed on both the tool and bag side prior to installation.

The fasteners 12 may be made of metal such as titanium and may comprise a bolt 18 (FIG. 3), preferably a Hi-Lok bolt (or e.g., a Lockbolt, Eddiebolt or Sleeved Lockbolt) with a preload shear, having a beveled head 20, which is countersunk into a correspondingly shaped opening 22 (FIG. 1) in the skin panel 14, and a shank 24 (0.25 inch diameter bare titanium with a 100 degree shear head—other diameters and fastener head angles are possible depending on the fastener size), which passes through the skin panel 14 and spar 16 to be secured by a metallic nut 26 (FIG. 2) engaging the spar 16. A sealant (not shown) may be introduced on the shank 24 prior to installation into the spar 16 and skin panel 14. A shim 28, preferably an insulating shim, about 2 mils in thickness, is interposed between the skin panel 14 and the spar 16 as a filler to make up for any differences in the thickness of the skin panel 14. The shim 28 may be sealed to the panel 14 and spar 16 using a fay sealant 30.

The fastener 12 also secures an electrically conductive layer 32, preferably a copper foil grid in the form of a plurality of strips 33, and a fiberglass ply layer 34, respectively, to the skin panel 14. The electrically conductive layer 32 is therefore considered an integral part of the skin 14. The aircraft wing structure 10 may be coated with one or more primer coats (here shown as a single layer of primer 36) over the outer surface of the skin panel 14, covering both the fiberglass ply layer 34 and the head 20 of the fastener 12, which may be substantially flush with the outer surface of the grid 32. One or more layers 42 of paint may then be applied over the entire outer surface of the primer 36.

If a copper foil grid is used as the electrically conductive layer 32, each strip 33 of the copper foil grid 32 may be a 0.0027 inch thick, 2 ounce/ft$^2$ copper foil such as IPC-4562/Cu-E-2-2-D-S-2 copper foil, which is manufactured by Gould Electronics, Inc. of Chandler, Ariz. The strips 33 may each be individually centered along a respective fastener line 35 and are about 3.6 inches wide for a single fastener 12. While not shown in the present illustrations, the strips 33 may overlap depending upon their respective relative location along the spar 16 and skin panel 14. The electrically conductive layer 32 preferably has sufficient electrical conductivity to meet or exceed IPC-4562 grade specifications to ensure a conductive path to divert much of the electric current, generated by lightning strikes, away from each respective fastener 12 along a fastener line 35.

The fiberglass ply layer 34 is preferably an epoxy-prepreg material formed with a Style 120 E-glass and a 250-degree Fahrenheit cure thermosetting epoxy resin. Alternatively, and without limitation, a wet lay-up of a similar glass weave (E-glass, Style 108) in a 250-degree Fahrenheit cure thermosetting epoxy resin may also be utilized. Other appropriate types of fiberglass or other suitable materials may be used.

The primer 36 may consist of a conventional thermosetting epoxy-based fuel tank primer well known to those of ordinary skill in the art in the aerospace industry. The primer 36 is applied in one or more coats to a dry film thickness of between about 0.5 and 0.9 mils. The primer 36 may be air dried for between about 4 hours prior to applications of the overlying paint layers 42. Other appropriate types of primers may be used.

The paint layer, or layers 42, preferably are formed from a conventional, aerospace grade polyurethane enamel that is also well known to those of ordinary skill in the art in the aerospace industry. This polyurethane enamel is preferably applied as a single layer of approximately 2 mil (±0.1) dry thickness over the previously dried primer 36. If more than about 48 hours has passed since application of the primer 36, it may be required to reactivate the surface of the primer 36 by applying a solvent such as isopropyl alcohol or other appropriate solvent prior to applying the paint 42. The paint 42 may be air dried for between about 4 hours and 7 days to ensure complete curing.

Figure 3:
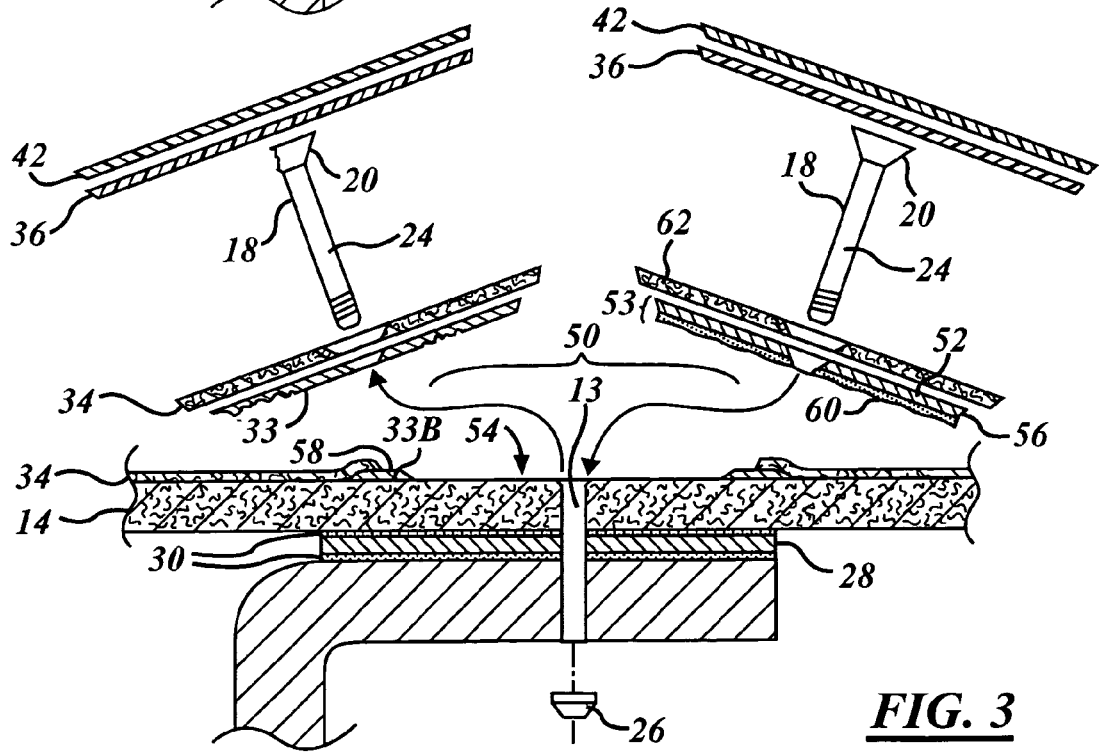
FIG. 3 is a section view of a general method for repairing the damaged portion of the wing structure of FIG. 1 in accordance with the general principals of a preferred embodiment.
Figure 4:
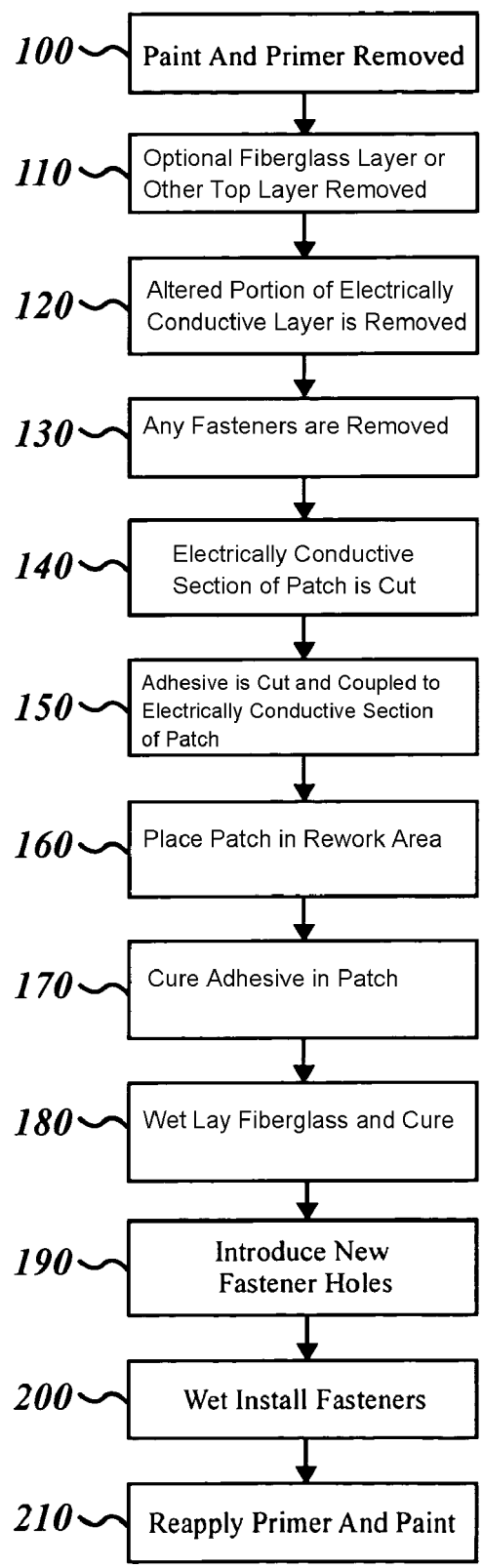
FIG. 4 is a logic flow diagram for repairing a wing structure of FIG. 1 in accordance with one preferred embodiment.
Figure 6:
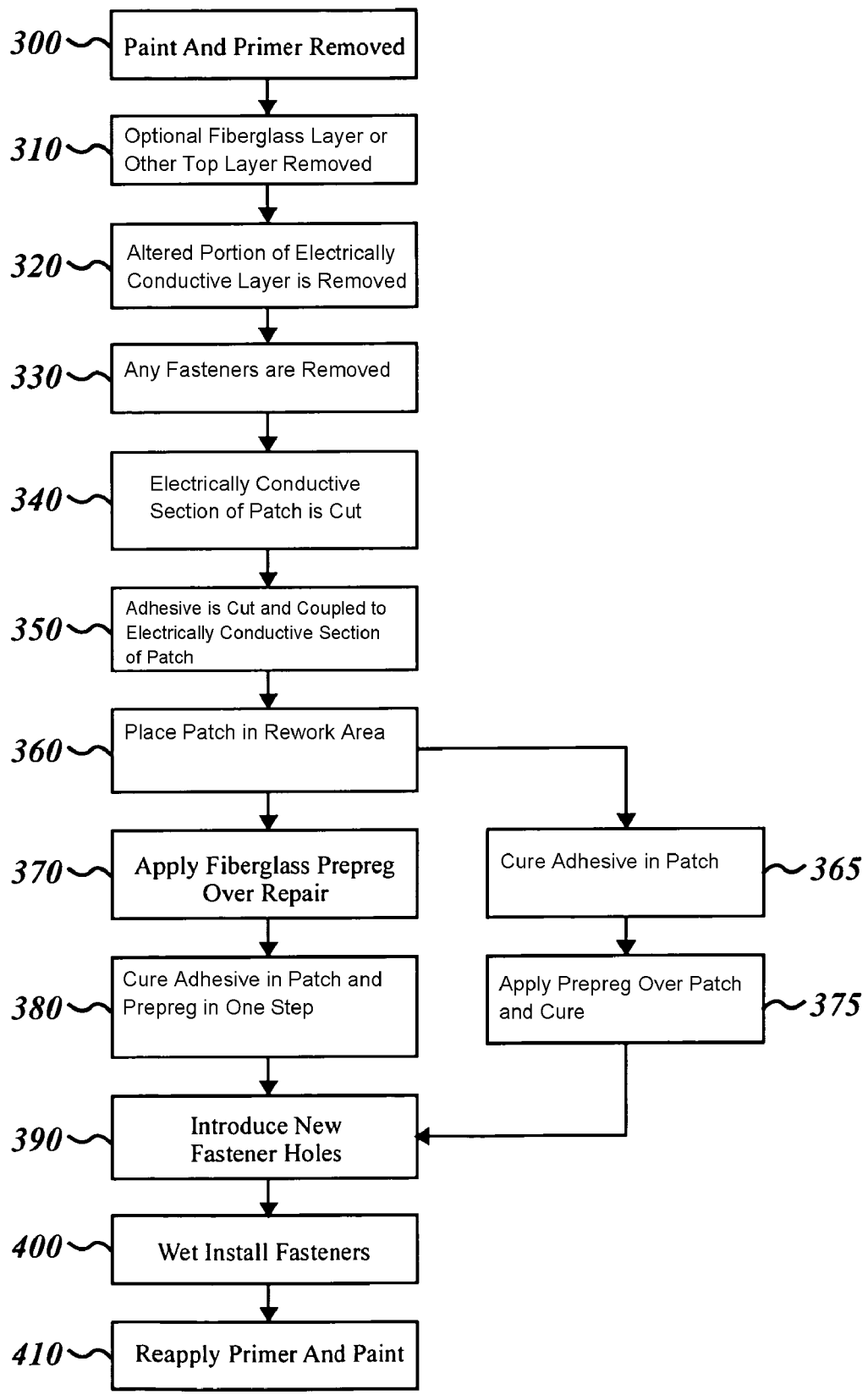
FIG. 6 is a logic flow diagram for repairing a wing structure of FIG. 1 in accordance with another preferred embodiment.

After a lightning strike, or due to some other type of event, the electrically conductive layer 32 and/or one or more of the fasteners 12 may be structurally altered such that a conductive path cannot be established to divert the electrical current away from the fasteners 12 and along the surface of the wing structure 10 away from the underlying fuel tank substructures, such as fuel tanks. The altered area 50, as shown in FIG. 3 may be reworked prior to subsequent use of the aircraft. Two preferred methods for reworking the altered area 50 are proposed herein. Each method reworks an altered area 50 of the electrically conductive layer 32 and introduces a patch 53 to that area. Each method is described in logic flow diagrams in FIGS. 4 and 6, respectively. The resulting reworked structures formed using the logic flow diagrams of FIGS. 4 and 6 are shown in FIGS. 5 and 7, respectively.

Both provided methods are generally carried out by first removing any surfacers, fasteners 12 or other layers 34, 36, 42, and removing a portion of the discontinuous electrically conductive layer 32 to expose a portion of the underlying composite skin 14. A patch 53 having an electrically conductive section 52, preferably copper foil, coupled to an adhesive layer 60 having a low dielectric breakdown strength is formed. The dielectric breakdown strength of the adhesive 60 should be low enough that lightning striking the aircraft would pass through the adhesive and be diverted away from fasteners. Further, the adhesive layer 60 is preferably an unsupported epoxy film adhesive with which no scrim is used. The patch 53 is introduced over the removed portion of the electrically conductive layer 32. The patch 53 is optionally covered with a resin impregnated fiberglass material 62. The adhesive layer 60 and, optionally, resin impregnated fiberglass material 62 may then be cured or set. Fasteners 12 may then be inserted into the fiberglass material 62, patch 53 and underlying composite skin 14, and the surface of the composite wing may be re-primed and repainted to complete the method.

In the disclosed methods, the patch 53 is secured to the top surface of the composite structure 14 with an adhesive layer 60. Is it desirable that the adhesive 60 used to secure the patch 53 to the surface of the composite 14 enables the detail surface to be structurally robust during installation and removal and also to help direct current to the top surface of the composite structure during a lightning strike. To meet these requirements, an unsupported film adhesive utilizing no scrim is proposed. Here, unsupported refers to the use of no carrier materials. Additionally, the adhesive 60 should have a low dielectric breakdown strength so that when a lightning strike occurs, the adhesive layer becomes conductive and sufficient lightning current passes through the adhesive layer 60 itself to prevent an undesirable concentration of current at the metal fasteners 12 which can lead to undesirable effects such as arcing. One possible adhesive for bonding the copper foil to the composite surface is a flexible film epoxy adhesive, such as the FM®-300 series adhesives manufactured by Cytec Engineered Materials. This type of epoxy adhesive produces high peel strength and superior resistance to cracking when the underlying composite material flexes. In addition, the electric properties of the adhesive help direct the current path of a lightning strike in the composite structure. By containing the lightning current, potential outward sparking or arcing is minimized.

One example of an unsupported epoxy resin film is FM®300-2 adhesive available from Cytec Engineered Materials, Havre de Grace, Md. Additional appropriate adhesives include AF162-2U from 3M Company and EA9696U from Henkel Corporation. As used herein, "unsupported" means an adhesive in which no carrier materials are utilized.

The unsupported FM®300-2 modified epoxy film adhesive is a 250° F. (120° C.) cure version of widely used FM®300 film adhesive, delivers the same high temperature performance toughness and stress strain properties of the FM®300 film adhesive without requiring a 350° F. (175° C.) cure cycle. FM®300-2 adhesive is particularly desirable for co-cure and secondary composite bonding applications. The required cure temperature is reduced allowing for secondary bonding of structure far below the composite's glass transition point. FM®300-2 film adhesive also offers optimum flow control desirable for co-cure composite bonding. FM®300-2 is therefore preferred for use as a surfacing film, and is highly desirable for use as an unsupported film as it is used herein. It can be utilized at service temperatures of from 67° F. to 300° F. (−55° C. to 150° C.) and has excellent moisture and corrosion resistance in high humidity environments with no significant reduction in mechanical properties. It has a nominal weight of 0.030 psf (145 gsm) (weight tolerance equals nominal weight±0.005 psf (±25 gsm)) and a favorable shelf life of 12 months when stored at or below 0° F. (−18° C.). Additional information with respect to FM®300-2 can be obtained from Cytec Engineered Materials—Product Information Sheet, "FM®300-2 Dual Cure Capable, Film Adhesive/Surfacing Film," Apr. 6, 2007.

In one preferred embodiment, the method is performed by first removing any surfacers (paints, primers, fiberglass layers) as well as a portion of the electrically conductive layer 32 to create an opening to the underlying composite skin 14. Any fasteners 12 in the immediate area of the removed portion of the electrically conductive layer 32 are also removed. A patch 53 consisting of an adhesive layer 60 and an electrically conductive section 52, preferably copper foil, is then bonded and cured over the opening above the composite skin 14. One ply of resin-impregnated fiberglass 62 may then be wet-laid over the surface of the patch 53 and cured. Holes are drilled through the cured fiberglass plies 62 and patch 53 and fasteners 12 are installed. This allows the fasteners 12 to be coupled to the underlying composite skin 14 and electrically conductive layer 32. The primer and paint are then reapplied and cured over the fiberglass 62 to complete the method.

In another preferred embodiment, the method is performed by first removing any surfacers (paints, primers, fiberglass layers) as well as a portion of the electrically conductive layer 32 to create an opening to the underlying composite skin 14. Any fasteners 12 in the immediate area of the removed portion of the electrically conductive layer 32 are also removed. A patch 53 consisting of an adhesive layer 60 and an electrically conductive section 52 is then placed within the opening such that the adhesive 60 is contained between the electrically conductive layer 32 and the underlying composite skin 14. One ply of a fiberglass prepreg material 80 is then applied over the patch 53. The ply 80 and adhesive 60 are then preferably cured simultaneously in a single step under heat and pressure, although alternatively they may be cured individually after application. Holes are drilled through the fiberglass layer 80 and patch 53 and the fasteners 12 are reinstalled. This allows the fasteners 12 to be recoupled to the underlying composite skin 14 and patch 53. The primer and paint are then reapplied and cured over the fiberglass prepreg 80 to complete the method. The patch 53 as utilized herein comprises an electrically conductive section 52 and an adhesive layer 60.

Preferred methods will now be laid out in more detail, with reference to FIGS. 4 and 6. Nothing described below should be construed to be limiting, as it should be recognized that alterations known to persons of ordinary skill in the art may be made to the methods described below.

Referring now to FIG. 4, in one preferred method of the present disclosure, beginning with Step 100, the paint 42 and primer 36 layers are first removed from the altered area 50 of the wing structure 10. Preferably, additional material is removed within approximately a two inch radius, at a minimum, from the paint 42 and primer 36 that is removed. Preferably, a 150-grit or finer abrasive is used, to help ensure that all of the paint 42 and primer 36 are removed without affecting the underlying fiberglass layer 34, if such a layer is present.

Next, in Step 110, any composite ply fiberglass layers 34 are removed, preferably via a sanding process. Any other appropriate process for removing the fiberglass layers may be used. In this process, a low or high temperature pressure tape (not shown) may first be applied along the outline of the area of any fiberglass layers to be removed. If sanding is the method of removal, the sanding may be performed either manually or mechanically using various grits of sandpaper, and/or diamond or carbide cutting wheels. The sanding may be done in either a circular, oblong or semicircular pattern based on the configuration and location of the altered area 50. The area may then be finish sanded with 240-grit or finer sandpaper. The fiberglass ply 34 remaining may then be unmasked and solvent washed. The sanded area may then be wiped dry.

Next, in Step 120, assuming the electrically conductive layer 32 is a copper foil grid, any undesired copper from a strip or strips 33 are carefully removed without impairing the underlying skin 14. For simplicity, in FIG. 3, one damaged strip 33 is illustrated. Unaltered copper foil 33B from each respective altered strip 33 is maintained in its location on top of the carbon fiber skin 14 around the rework area 54. If the electrically conductive layer is not a copper foil grid, then the altered area 50 of the electrically conductive layer 32 is removed in an appropriate manner.

In Step 130, the fasteners 12 may be removed in the immediate area of the altered area 50, leaving fastener holes 13 open. The fasteners 12 may or may not have been affected by a lightning strike or other issue. The fastener holes 13 may then be plugged with a plug, which may be a ¼ inch polytetrafluoroethylene plug. A filler, such as milled glass and a 150-degree Fahrenheit curing thermosetting epoxy resin may be introduced around the plug to fill the countersink around the fastener hole 13. Localized heat of sufficient temperature may be introduced near the fastener hole 13 to cure the epoxy resin.

Next, in Step 140, if the electrically conductive layer 32 is a copper foil grid, a section of copper foil 52 is cut to approximately fit the rework area 54 with an overlap 56 over the periphery 58 of the underlying remaining copper foil strip 33B surrounding the rework area 54. Typically, this overlap 56 is between about one-half and one inch thick. The overlap helps to ensure that there is a conductive path between the electrically conductive section of the patch 53 and the electrically conductive layer 32. The copper foil section 52 is formed from the same type of material and has the same thickness as the original copper strip 33 (preferably Gould IPC-4562/Cu-E-2-2-D-S-2 (0.0027 inches thick, 2 oz.)). The copper foil section 52 may be rinsed with isopropyl alcohol or another appropriate solvent, without sanding or abrasion, to prepare the copper foil section 52 for subsequent bonding to an adhesive layer 60, such as FM® 300-2 manufactured by Cytec Engineered Materials of Havre de Grace, Md. Other appropriate adhesives may be used.

In Step 150, if an epoxy film adhesive is used, the adhesive 60, is cut to approximately the same size as the copper foil section 52 and coupled to the underside of the copper foil section 52 to form a copper patch 53. The adhesive 60 is preferably an unsupported adhesive material, meaning that there are no carrier materials utilized. One example of an adhesive that may be used is an epoxy film adhesive 60 having a thickness of about 0.005 inches and a nominal weight of about 0.030 pounds per square foot. One example of an unsupported modified epoxy film adhesive 60 is FM300-2U, a 250 degree Fahrenheit cure thermosetting epoxy adhesive available from Cytec Engineered Materials.

In alternative embodiments, a 350-degree Fahrenheit curing thermosetting epoxy adhesive film 60 may be utilized.

In Step 160, the patch 53 is introduced to the rework area 54 such that the film adhesive 60 covers the underlying skin 14 and overlaps 57 a portion of the outer periphery 58 of the remaining copper strip 33B and such that the electrically conductive section 52 covers substantially the entire portion of the adhesive layer 60. This may be done by first introducing the adhesive layer 60 over the skin 14 and overlapping the remaining strip 33B and then introducing the electrically conductive section 52 onto the adhesive layer 60. Alternatively, the adhesive layer 60 may first be bonded to the electrically conductive section 52 to form the patch 53, and the patch may then be subsequently introduced as a single unit onto the skin 14 with the adhesive side 60 contacting the skin 14. Preferably, the adhesive layer 60 contains microscopic holes, further decreasing the dielectric breakdown strength of the layer and providing an electrical connection between the electrically conductive section 52 of the patch 53 and the skin 14. Optionally, for better electrical conductivity during lightning strikes, the adhesive layer 60 may contain flakes of a conductive material such as copper or silver.

In Step 170, and as best shown in FIG. 5, the electrically conductive section 52 is bonded onto the remaining underlying copper strip 33B over the rework area 54 in the overlap 56 by adhering the adhesive layer 60 to the copper foil section 52, the outer periphery 58 of the copper strip 33B and to the underlying skin 14. The adhesive may be cured or set depending on the type of adhesive used. If the adhesive is an epoxy adhesive, it is cured. For the 250-degree Fahrenheit cure thermosetting epoxy adhesive, a temperature of about 255+/−10 degrees Fahrenheit for about 90 minutes using a vacuum bag (not shown) technique and a heat blanket (not shown) is utilized. Most preferably, a vacuum bag is used and maintained at a negative pressure of about 25 in Hg, while the bag side temperature is ramped up in 5-degree Fahrenheit increments until a heat blanket temperature of about 255 degrees Fahrenheit is reached. The heat blanket temperature is maintained at 255 degrees Fahrenheit for about 90 minutes to ensure complete cure. The heat blanket temperature is then reduced slowly to 140 degrees Fahrenheit before the vacuum bag is removed. The heat blanket is removed after the vacuum bag. To ensure proper temperature control, thermocouples (not shown) are preferably positioned against the skin 14 next to the spar 16 and on the skin side of the spar 16 prior to the curing step.

For a 350-degree Fahrenheit cure thermosetting epoxy adhesive, a temperature of about 355±10 degrees Fahrenheit for about 90 minutes using a vacuum bag technique and a heat blanket is utilized. Most preferably, a vacuum bag is used and maintained at a negative pressure of about 25 in Hg, while the bag side temperature is ramped up in 5-degree Fahrenheit increments until a heat blanket temperature of about 355 degrees Fahrenheit is reached. The heat blanket temperature is then maintained at 355 degrees Fahrenheit for about 90 minutes to complete cure. The heat blanket temperature is then reduced slowly to 140 degrees Fahrenheit before the vacuum bag is removed. The heat blanket is removed after the vacuum bag. To ensure proper temperature control, thermocouples (not shown) are preferably positioned against the skin 14 next to the spar 16 and on the skin side of the spar 16 prior to the curing step.

Next, in Step 180, if a fiberglass layer is used over the patch, a layer of a resin-impregnated fiberglass fabric 62 may be wet-laid over the cured patch 53 with a 0.5-inch overlap over the outer periphery of the patch 53.

To form the resin-impregnated fiberglass fabric 62, otherwise known as a ply 62, a solid parting (not shown) film which may be at least four inches larger in every direction than the piece of fiberglass fabric being impregnated is first laid on a flat surface. Next, a layer of a 150-degree Fahrenheit curing thermosetting epoxy resin (not shown) is applied to the parting film. Next, a layer of E-glass fiberglass fabric (not shown) is applied onto the epoxy resin layer. Another layer of epoxy resin (not shown) is then applied over the fiberglass fabric. The preferred ratio of resin to fiberglass fabric is between about 1 and 1.5 ounces of resin per ounce of fabric. A second layer of parting film (not shown) is applied onto the second resin layer. Finally, the resin of the resin layers is uniformly impregnated within the glass fabric using a roller, squeegee or similar device. Most preferably, a vacuum bag (not shown) is placed over the assembly to facilitate impregnation.

Next, the ply 62 is wet-laid onto the patch 53. To accomplish this, the parting film is removed from one side of the ply 62 and the exposed side (not shown) is laid onto the electrically conductive section 52. The second piece of parting film (not shown) of the ply 62 is then removed from the surface opposite (not shown) the patch 53. The ply 62 is then vacuum bagged (not shown) to ensure complete infiltration of the additional epoxy resin within the ply 62.

Finally, a heat blanket (not shown) is coupled to the ply 62 and the epoxy component of the fiberglass fabric 62 layer is cured under vacuum with a heat blanket temperature of about 200+/−10 degrees Fahrenheit for about 220 minutes. The heat blanket is then removed.

Next, in Step 190, new fastener holes 64 are drilled through the cured fiberglass layer 62, the patch 53, skin 14, and through into the underlying shim 28 and spar 16. The new fastener holes 64 are inspected to verify location and to confirm shape and size.

In Step 200, fasteners 12 are wet-installed by conventional techniques through fastener holes 64, which include applying a full faying surface sealant to the shank 24 not in the threaded area. The fasteners 12 are torqued to within design tolerances during the working life of the sealant. Excess sealant is removed after the installation of the fasteners 12 have been verified for proper grip length; head flushness, torque value and sealant squeeze out.

Finally, in Step 210, the layers of primer 32 and paint 42 are reapplied over the fiberglass ply 62 and fasteners 12 in a method similar to that described above in forming the original painted and primed surface. The resultant repair is shown in FIG. 5.

Referring now to the flow chart of FIG. 6, and as further shown in FIG. 7, in another preferred method, Steps 300-360 are first performed utilizing the same materials and in exactly the same manner as Steps 100-160 above.

Next, in Step 370, a layer of fiberglass prepreg 80 is applied onto the applied patch 53. The fiberglass prepreg 80 consists of E-glass fabric pre-impregnated with either a 250- or 350-degree Fahrenheit curing thermosetting epoxy resin. The fiberglass prepreg 80 is cut to fit with a 0.5-inch overlap over the periphery of the repaired area 54.

In Step 380, the epoxy component of the fiberglass prepreg 80 is cured using a vacuum bag technique and a heat blanket If the adhesive layer 60 has an epoxy adhesive that has a curing temperature the same as that of the epoxy component of the fiberglass prepreg 80, the adhesive layer 60 may be cured in step 380 as well. For the 250-degree cure, a temperature of about 255+/−10 degrees Fahrenheit for about 2 hours using a vacuum bag technique and a heat blanket is utilized. For the 350-degree Fahrenheit cure, a temperature of about 355+/−10 degrees Fahrenheit for about 2 hours using a vacuum bag technique and a heat blanket is utilized. The heat blanket and vacuum are then removed and the cured layers of both the prepreg 80 and adhesive 60 are cooled.

Alternatively, as shown in Step 365 and 375, when the curing temperature of the epoxy adhesive 60 is different than the curing temperature of the epoxy component of the prepreg 80, a different method is utilized.

First, as shown in Step 365, the epoxy adhesive 60 is cured as in the method of Step 170 above to bond the copper foil section 52 to the skin 14.

Next, in Step 375, the epoxy prepreg 80 is layed onto the copper foil section 52 and separately cured. For the 250-degree cure thermosetting epoxy adhesive, a temperature of about 255+/−10 degrees Fahrenheit for about 2 hours using a vacuum bag technique and a heat blanket is utilized. For the 350-degree Fahrenheit cure thermosetting epoxy adhesive, a temperature of about 355+/−10 degrees Fahrenheit for about 2 hours using a vacuum bag technique and a heat blanket is utilized. The cured layers of both the prepreg 80 and adhesive 60 are then cooled.

Next, in Step 390, proceeding either from Step 375 or 380, new fastener holes 64 are drilled through the fiberglass prepreg 80, the copper foil section 52, skin 14, and through into the underlying shim 28 and spar 16 as described above in Step 190.

In Step 400, fasteners 12 are reinserted and secured substantially as described above in Step 200.

Finally, in Step 410, the layers of primer 36 and paint 42 are reapplied and cured onto the fiberglass prepreg 80 and over the fasteners 12 using techniques described above in Step 210. The resultant repaired wing structure 10 is best illustrated in FIG. 7.

The present application thus describes preferred methods for reworking composite structures such as wing structures 10 altered by lightning strikes or by some other means. This rework helps to maintain the integrity of the lightning protection system to help divert lightning currents away from the fuel tank substructures by providing a lower resistance path along the wing's surface. The repair also maintains the reduction of current density at the target fasteners by allowing current sharing to the neighboring fasteners due to the reduced parallel path resistance created by the copper foil. The reestablishing of the electrical continuity of the copper foil grid bonded to composite forming the wing structure during the repair process following a lightning strike or other event causing undesirable alterations to an electrically conductive layer of a composite structure is described using a specialized type of film adhesive and namely an unsupported epoxy film adhesive. Through the use of a adhesive layer 60, electrical continuity is restored between outer and inner layers within the composite structure, which helps to protect against damage caused by lightning strikes. More specifically, use of an adhesive layer 60 having a low dielectric breakdown strength provides an electrical path between the copper foil section 52 of the patch 53, and the skin 14 of the aircraft in the area around the damaged composite structure surface, when lightning strikes the aircraft. Electrical continuity is restored throughout the plane of the interface between the adhesive 60 of the copper patch 53 and the skin 14 of the aircraft, thereby allowing electricity to flow between the copper foil 52 and the skin of the aircraft 14 at all points in the area of the patch 53 when lightning strikes the aircraft. This provides benefits over patching methods and systems not having adhesive layers with low dielectric breakdown strengths in that lightning strike electricity may be conducted through a dispersed area, thereby reducing the chance of arcing, or other damaging effects.

The methods of the preferred embodiments are relatively simple and cost effective, in that that utilize standard composite materials and can be performed easily in a relatively short amount of time. This rework helps to maintain the continuity of the lightning protection system to help divert lightning currents away from substructures such as, but not limited to fuel tanks, by providing a lower resistance path along the wing's surface. The rework also maintains the reduction of current density at the target fasteners by allowing current sharing to the neighboring fasteners due to the reduced parallel path resistance created by the copper foil. This limits the amount of down time for aircraft, thereby allowing the aircraft to spend more time in service.

While the disclosure has been described in terms of preferred embodiments, it will be understood, of course, that the disclosure is not limited thereto since modifications may be made by those skilled in the art, particularly in light of the foregoing teachings.

We claim:

1. A method for reworking the reduced impedance of an electrically conductive layer contained on an aircraft composite skin, the method comprising:
revealing a section of the electrically conductive layer;
removing a portion of electrically conductive layer to reveal an underlying composite skin;
introducing a section of replacement electrically conductive material and an unsupported solid film adhesive layer over said underlying composite skin such that an outer portion of the replacement electrically conductive section of said patch substantially overlaps an overlap region of an unremoved portion of the electrically conductive layer, and such that said unsupported solid film adhesive layer is sandwiched between and in contact with said overlap region of said unremoved portion of said electrically conductive layer and said section of replacement electrically conductive material, said substantial overlap forming an overlap splice joint between the replacement electrically conductive section and the overlap region of the unremoved portion of the electrically conductive layer, said overlap splice joint providing an electrically conductive path between the replacement electrically conductive material and the unremoved portion of the electrically conductive layer.

2. The method of claim 1, wherein:
revealing a section of the electrically conductive layer comprises removing any paint, primers, or other layers on the aircraft composite skin.

3. The method of claim 1, wherein said revealing further comprises:
removing one or more fasteners within said section of the electrically conductive layer, wherein removing each of said one or more fasteners leaves one or more fastener holes; and
plugging said one or more holes with one or more plugs.

4. The method of claim 1, further comprising:
wet-laying a resin-impregnated fabric over said section of replacement electrically conductive material; and
curing said resin-impregnated fabric.

5. The method of claim 4, further comprising:
curing said unsupported solid film adhesive layer; and
curing said resin impregnated fabric.

6. The method of claim 5 wherein said unsupported solid film adhesive layer is cured simultaneously with curing said resin impregnated fabric.

7. The method of claim 1, wherein:
the electrically conductive layer is a copper foil grid; and
the replacement electrically conductive section is made from copper foil.

8. The method of claim 3, wherein said one or more plugs substantially consist of polytetrafluoroethylene.

9. The method of claim 4, wherein said unsupported solid film adhesive layer comprises an unsupported thermosetting modified epoxy film adhesive.

10. A method for reworking an electrically conductive layer on a composite skin, comprising:
revealing a section of the electrically conductive layer;
removing a portion of the electrically conductive layer to reveal the underlying composite skin, leaving an unremoved section of the electrically conductive layer;
removing a fastener within said section of the electrically conductive layer, revealing a hole;
plugging the hole with a plug;
introducing a patch having a replacement electrically conductive section and an unsupported solid film adhesive layer over said underlying composite skin such that an outer portion of the replacement electrically conductive section of said patch substantially overlaps an overlap region of an unremoved portion of the electrically conductive layer, and such that said unsupported solid film adhesive layer is sandwiched between and in contact with said overlap region of said unremoved portion of said electrically conductive layer and said replacement electrically conductive section;
forming an overlap splice joint between the replacement electrically conductive section and the overlap region of the unremoved portion of the electrically conductive layer, said overlap splice joint providing an electrically conductive path between the replacement electrically conductive section and the unremoved portion of the electrically conductive layer;
wet-laying a resin-impregnated fabric onto said copper patch, and curing said resin-impregnated fiberglass fabric; and
curing said unsupported solid film adhesive layer and said resin impregnated fabric simultaneously.

11. The method of claim 10, wherein the replacement electrically conductive section within the patch overlaps the unremoved section of the electrically conductive layer by between approximately one half inch and approximately one inch.

12. The method of claim 10, wherein the unsupported solid film adhesive layer is approximately 0.005 inches thick.

13. The method of claim 10, wherein the unsupported solid film adhesive layer is a 250 Farenheit cure unsupported thermosetting epoxy film adhesive and has a nominal weight of about 0.030 pounds per square foot.

14. The method of claim 10, wherein the resin-impregnated fabric overlaps the copper patch by approximately one half inch.

15. The method of claim 10, wherein the plug is a substantially consists of polytetrafluoroethylene.

16. The method of claim 10, wherein revealing a section of the electrically conductive layer comprises:

removing any paint, primer or other layers over the area to be reworked.

17. The method of claim 10, wherein said unsupported solid film adhesive layer comprises an unsupported thermosetting modified epoxy film adhesive.

18. A method for reworking an electrically conductive layer on a composite skin, comprising:

revealing a section of the electrically conductive layer;

removing a portion of the electrically conductive layer to reveal the underlying composite skin, leaving an unremoved section of the electrically conductive layer;

removing a fastener within said section of the electrically conductive layer, revealing a hole;

plugging the hole with a plug substantially consisting of polytetrafluoroethylene;

introducing a patch having a replacement electrically conductive section and an unsupported solid film adhesive layer over said underlying composite skin, such that an outer portion of the replacement electrically conductive section of said patch substantially overlaps an overlap region of an unremoved portion of the electrically conductive layer, and such that said unsupported solid film adhesive layer is sandwiched between and in contact with said overlap region of said unremoved portion of said electrically conductive layer and said replacement electrically conductive section;

forming an overlap splice joint between the replacement electrically conductive layer and the overlap region of the unremoved portion of the electrically conductive layer, said overlap splice joint providing an electrically conductive path between the replacement electrically conductive material and the unremoved portion of the electrically conductive section, said unsupported solid film adhesive layer being a 0.005 inch thick layer of an unsupported thermosetting epoxy film adhesive; and curing said unsupported solid film adhesive layer;

said unsupported solid film adhesive layer covering the underlying composite skin and overlapping the unremoved section of the electrically conductive layer;

said replacement electrically conductive section within said patch covering said unsupported solid film adhesive layer; and said replacement electrically conductive section within said patch overlapping the unremoved section of the electrically conductive layer by between approximately one half inch and approximately one inch.

19. The method of claim 18, wherein:

the electrically conductive layer is a copper foil grid; and the patch is a copper patch and the electrically conductive section of the patch is made from copper foil.

20. The method of claim 18, further comprising:

introducing milled glass and a thermosetting epoxy resin around the plug.

21. A method for reworking the reduced impedance of an electrically conductive layer contained on an aircraft composite skin, the method comprising:

revealing a section of the electrically conductive layer;

removing a portion of electrically conductive layer to reveal an underlying composite skin;

introducing a section of replacement electrically conductive material and a film adhesive layer over said underlying composite skin such that an outer portion of the replacement electrically conductive section of said patch substantially overlaps an overlap region of an unremoved portion of the electrically conductive layer, and such that said film adhesive layer is sandwiched between and in contact with said overlap region of said unremoved portion of said electrically conductive layer and said section of replacement electrically conductive material, said substantial overlap forming an overlap splice joint between the replacement electrically conductive section and the overlap region of the unremoved portion of the electrically conductive layer, said overlap splice joint providing an electrically conductive path between the replacement electrically conductive material and the unremoved portion of the electrically conductive layer.

* * * * *